United States Patent [19]
Watabe et al.

[11] Patent Number: 6,064,803
[45] Date of Patent: May 16, 2000

[54] IMAGE INFORMATION DECODER WITH A REDUCED CAPACITY FRAME MEMORY

[75] Inventors: Akihiro Watabe, Nara; Eiji Miyagoshi; Yoshiyuki Goi, both of Osaka, all of Japan; William Brent Wilson, Singapore, Singapore

[73] Assignee: Matsushita Electric Industrial Co., Ltd., Osaka, Japan

[21] Appl. No.: 08/609,020

[22] Filed: Feb. 29, 1996

[30] Foreign Application Priority Data

Mar. 1, 1995 [JP] Japan .................................. 7-042027

[51] Int. Cl.[7] .............................. G06F 15/00; G06K 9/36
[52] U.S. Cl. ......................... 395/116; 345/501; 345/521; 382/232
[58] Field of Search ..................................... 348/402, 407, 348/412, 413, 415, 416, 500, 501, 550; 345/186, 202, 203, 501, 521; 395/509, 510, 507, 508, 116, 829; 382/232, 233, 236

[56] References Cited

U.S. PATENT DOCUMENTS

| | | | |
|---|---|---|---|
| 3,632,881 | 1/1972 | Graham | 395/829 |
| 4,972,407 | 11/1990 | Kawai | 370/68 |
| 5,197,063 | 3/1993 | Nakano et al. | 370/58.1 |
| 5,349,578 | 9/1994 | Tatsuki et al. | 370/68 |
| 5,434,857 | 7/1995 | Mori | 370/66 |
| 5,598,542 | 1/1997 | Leung | 395/297 |
| 5,646,693 | 7/1997 | Cismas | 348/402 |

OTHER PUBLICATIONS

Shun–ichi Ishiwata et al., "Development of an MPEG2 decoder LSI–Efficient Memory Allocation", 1994, Proceedings of the 1994 IEICE Spring Conference C–659, Mar. 1994 and an English translation thereof.

*Primary Examiner*—Edward L. Coles
*Assistant Examiner*—Mark Wallerson
*Attorney, Agent, or Firm*—McDermott, Will & Emery

[57] ABSTRACT

The present invention discloses an MPEG decoder for reproducing moving picture data. A first frame memory (FM0) and a second frame memory (FM1), each of which is composed of 2N slots, are provided. A third frame memory (FM2) is provided which is composed of N+4 slots. Each slot is provided with a memory capacity of eight lines. FM0 and FM1 each have a 1-frame memory capacity for storing reference frames for motion compensation. FM2, on the other hand, has a memory capacity of half a frame+32 lines for B-PICTURE interlace conversion. A slot control memory (SM) is further provided which is composed of 2N+6 words each of which stores a respective slot number of FM2. For an output section to read the slots of FM2 in the correct order, the contents of SM are updated by an control section at the time of the writing of FM2 by a decoding section.

12 Claims, 16 Drawing Sheets

FIG.5

| ADDRESS | SM / SLOT NUMBER |
|---|---|
| 0 | |
| 1 | |
| 2 | |
| ⋮ | |
| 2N+5 | |

| IN | I0 | P1 | P4 | B2 | B3 |
|---|---|---|---|---|---|
| TYPE | I | P | P | B | B |
| WQ | 0 | 1 | 0 | 1 | 1 |
| FORWARD REF. | — | FM0 | FM1 | FM1 | FM1 |
| BACKWARD REF. | — | — | — | FM0 | FM0 |
| WRITE | FM0 | FM1 | FM0 | FM2 | FM2 |

FIG. 10

| IN | I0 | I0 | P1 | P1 | P4 | P4 | B2 | B2 | B3 | B3 | |
|---|---|---|---|---|---|---|---|---|---|---|---|
| TYPE | I | I | P | P | P | P | B | B | B | B | |
| WQ | 0 | 0 | 1 | 1 | 0 | 0 | 1 | 1 | 1 | 1 | |
| RQ | 2 | 2 | 2 | 0 | 0 | 1 | 1 | 0 | 0 | 0 | 0 |
| WRITE | FM0 | FM0 | FM1 | FM0 | FM0 | FM0 | FM2 | FM2 | FM2 | FM2 | FM2 |
| READ | | | | FM0 | FM0 | FM1 | FM1 | FM2 | FM2 | FM2 | FM2 |
| OUT | | | | TOP 0 | BTM 0 | TOP 1 | BTM 1 | TOP 2 | BTM 2 | TOP 3 | BTM 3 |

FIG.13

| PERIOD | 0 | 1 | 2 | 3 | 4 | 5 | 6 | 7 | 8 | 9 | 10 | 11 |
|---|---|---|---|---|---|---|---|---|---|---|---|---|
| IN | | | ←⎯ I0 ⎯→ | ←⎯ I0 ⎯→ | ←⎯ I0 ⎯→ | ←⎯ I0 ⎯→ | ←⎯ I0 ⎯→ | ←⎯ I0 ⎯→ | | | ←⎯ P1 ⎯→ | ←⎯ P1 ⎯→ |
| OUT | ←⎯ VB ⎯→ | | | | ←⎯ VB ⎯→ | | | | ←⎯ VB ⎯→ | | | |
| WRITE | | | FM0 0 6 | FM0 1 7 | FM0 2 8 | FM0 3 9 | FM0 4 10 | FM0 5 11 | | | FM1 0 6 | FM1 1 7 |
| READ | | | | | | | | | | | | |

FIG. 14

| PERIOD | 12 | 13 | 14 | 15 | 16 | 17 | 18 | 19 | 20 | 21 | 22 | 23 |
|---|---|---|---|---|---|---|---|---|---|---|---|---|
| IN | P1 | P1 | P1 | P1 | | | P4 | P4 | P4 | P4 | P4 | P4 |
| OUT | VB | IO | TOP IO | IO | VB | IO | BTM IO | IO | VB | P1 | TOP P1 | P1 |
| WRITE | FM1 2 8 | FM1 3 9 | FM1 4 10 | FM1 5 11 | | FM0 6 7 | FM0 0 6 | FM0 1 7 | FM0 2 8 | FM0 3 9 | FM0 4 10 | FM0 5 11 |
| READ | | FM0 0 1 | FM0 2 3 | FM0 4 5 | | | FM0 8 9 | FM0 10 11 | | FM1 0 1 | FM1 2 3 | FM1 4 5 |

FIG. 15

| PERIOD | 24 (1) | 25 (2) | 26 (3) | 27 | 28 (4) | 29 (5) | 30 (6) | 31 (7.1) | 32 (7.2) | 33 (8) | 34 (9) | 35 (10.1) |
|---|---|---|---|---|---|---|---|---|---|---|---|---|
| IN | B2 | B2 | B2 | | B2 | B2 | B2 | | B3 | B3 | B3 | |
|  | ←BTM | | | TOP→ | ←BTM | | | TOP→ | ←TOP | | BTM→ | |
| OUT | VB | P1 | P1 | P1 | VB | B2 | B2 | B2 | VB | B2 | B2 | B2 |
| WRITE | FM2 01 | FM2 23 | FM2 45 | | FM2 67 | FM2 89 | FM2 02 | | FM2 46 | FM2 80 | FM2 13 | |
| READ | | FM1 67 | FM1 89 | FM1 10 11 | | FM2 02 | FM2 46 | FM2 80 | | FM2 13 | FM2 57 | FM2 92 |

FIG.16

| PERIOD | 36 (10.2) | 37 (11) | 38 (12) | 39 (13) | 40 | 41 (14) | 42 (15) | 43 (16) | 44 | 45 | 46 | 47 |
|---|---|---|---|---|---|---|---|---|---|---|---|---|
| IN | B3 (BTM) | B3 | B3 (BTM) | | | | | | | | | |
| OUT | VB | B3 (TOP) | B3 | B3 | VB | B3 | B3 (BTM) | B3 | VB | | | |
| WRITE | FM2 57 | FM2 92 | FM2 46 | | | | | | | | | |
| READ | | FM2 46 | FM2 80 | FM2 13 | | FM2 57 | FM2 92 | FM2 46 | | | | |

IMAGE INFORMATION DECODER WITH A REDUCED CAPACITY FRAME MEMORY

BACKGROUND OF THE INVENTION

This invention relates to an image processor that finds preferable applications in image information decoding.

MPEG (Moving Picture Image Coding Experts Group, the working group of ISO/IEC) is the international standards for moving picture data compression and extension. An MPEG decoder for reproducing moving picture data is essentially composed of a data processor. This data processor is formed of a variable length decoder (VLD), an inverse quantizer (IQ), an inverse discrete cosine transformer (IDCT), and a motion compensator (MC). In addition to these components, the MPEG decoder further requires a plurality of frame memories for motion compensation and for interlace conversion.

A key feature of the MPEG decoder is that two frames are used for motion compensation, one of which is the frame of a preceding image (an image that precedes in time) and the other of which is the frame of a following image (an image that follows in time). If motion compensation is applied to every image, this gives rise to error propagation and problems with, for example, special reproduction. To cope with these drawbacks, intra-coded pictures (I-PICTURES), predictive-coded pictures (P-PICTURES), and bidirectionally predictive-coded pictures (B-PICTURES) are introduced. The I-PICTURE is the coding type I picture and makes no reference to any other images at all. The P-PICTURE is the coding type P picture and is motion-compensated from its preceding frame. The B-PICTURE is the coding type B picture and is bidirectionally motion-compensated from both its preceding and following frames. Note that the B-PICTURE is never used as a reference frame for decoding another frame.

A manner of predicting each of the coding types I, P, and B is explained. Suppose here that input pictures' bit streams are sequentially fed to an MPEG decoder in the IO→P3→B1→B2 order. P3 is motion-compensated from IO. B1 is motion-compensated from IO and P3. B2 is motion-compensated from IO and P3. IO, B1, B2, and P3 are displayed in that order. In the MPEG decoder, the order of decoding and the order of display disagree. It is therefore necessary to make a change in the order within the MPEG decoder. Additionally, the decoding of B1 and B2 requires data of two frames, i.e., the data about IO and P3. This produces a need for a frame memory with a capacity of two frames for motion compensation. The MPEG decoder therefore needs a capacity of two frames for motion compensation reference.

The order of decoding by the pixel and the order of image output by the pixel are now explained. For example, in television system, even-numbered lines are first outputted and odd-numbered lines are then outputted, in other words pixels are outputted every other line from the upper left to the lower right of the screen. Whereas a field made up of the even-numbered lines only is called a top field, a field made up of the odd-numbered lines only is called a bottom field. Interlace output is executed such that the top field is first outputted from the upper left down to the lower right and the bottom field is likewise outputted from the upper left down to the lower right.

Image data are two-dimensional and, for example, two items of image data lying adjacent in space to each other are considered having a strong correlation therebetween. For the case of the interlace output, when looking at, for example, one line of the top field, a line one line up of that top field line is the line that belongs to the bottom field. In other words, although a pixel of a top field line lies spatially adjacent to a pixel of a line one line up of the top field line (i.e, a bottom field line), these pixels are apart from one another in time. If motion is violent, there may be a possibility that a stronger correlation appears between a line and another line not one line up but two lines up, since these lines lie adjacent, in time, to each other. Assuming that such a possibility may exist, the order of decoding by the pixel is roughly divided into two categories in the MPEG, namely the order of decoding in the case of the frame (FR) structure and the order of decoding in the case of the field (FD) structure.

In MPEG, the processing of decoding is executed by the basic unit known as a macro block formed of 16×16 pixels. One macro block is decoded from left to right. For example, the rightmost pixel of the uppermost line of an image is contained in the rightmost macro block of the image. When the decoding of the rightmost macro block is completed, data of sixteen lines is decoded. Therefore, in the MPEG, data items of sixteen lines are decoded at about the same time.

For the case of the FR structure, 1-frame data is made up of macro blocks each of which is formed of 16×16 pixels and each macro block is decoded individually, wherein the top and bottom fields are decoded at about the same time. As a result, the order of decoding and the order of image output disagree at all. It is therefore necessary to make a change in the order.

For the case of the FD structure, one frame is divided into a top field and a bottom field. Each of the top and bottom fields is formed of individual macro blocks each of which is made up of 16×16 pixels. In this case, an entire macro block belongs either to the top field only or to the bottom field only. Decoding is carried out by the macro block by field. That is, every data about the top field is decoded before the decoding of data about the bottom field starts. As a result, the order of decoding and the order of image output roughly agree; however, these orders do not agree completely because the decoding is executed by the macro block.

The top field of a frame is first outputted. This is followed by the bottom field output. When giving a look at a point where the last eight top field line output begins, the decoding of the macro block for the last sixteen lines of the frame must be completed before the point. The reason is that the values of the rightmost sixteen pixels of the last eight lines are decided only after the last macro block of the image is decoded. Therefore, both the decoding of the top field and the decoding of the bottom field must be completed at the point. Thereafter, the eight top field lines and the entire bottom field must be outputted by turns, with their data already decoded. Therefore, if data about the eight top field lines and data about the entire bottom field are not stored beforehand, they are lost before being outputted, resulting in failing to provide image outputs. In other words, this requires a frame memory with a memory capacity of about half a frame for storing data about the entire bottom field and data about the last eight top field lines.

To sum up, the motion compensation, on the one hand, requires a memory capacity of two frames, and the interlace conversion, on the other hand, requires a memory capacity of about half a frame. The total memory capacity is about 2.5 frames.

Ishiwata et al. report an MPEG decoder that employs a memory that uses one and half a frame for interlace conversion (Proceedings of the 1994 IEICE Spring Conference, C-659, March 1994). Such a memory, since it requires a capacity of one and half a frame, is expensive thereby increasing the costs of production. As pointed out above, a memory with a memory capacity of half a frame is, in principle, sufficient enough for achieving interlace conversion. Therefore, there still exists room for further improvements in reducing the memory capacity.

SUMMARY OF THE INVENTION

Accordingly, an object of this invention is to provide an improved MPEG decoder employing a frame memory with a reduced memory capacity.

In order to achieve the object, the inventer of the present invention noted the following two points. The one point is that once a B-PICTURE is outputted it will not be reused. The other point is that it is possible to predict when regions of a macro block under decoding are outputted by analyzing part of additional information of an input picture. More specifically, a data memory is divided into a plurality of slots and the numbers of the slots stored in a slot control memory are used to control the reading and writing of the data memory.

In accordance with the present invention, the contents of the slot control memory are updated at the time of the writing of the data memory in order that the slots of the data memory are read in the correct order. Therefore, if such a data memory is used as an interlace conversion memory, this achieves B-PICTURE interlace conversion with a memory having a memory capacity of about half a frame. The frame memory capacity is reduced.

BRIEF DESCRIPTION OF THE DRAWINGS

FIG. 5 is a conceptual diagram depicting the internal structure of a slot control memory in FIG. 1.

FIG. 9 shows the rough operation of the decoding section in FIG. 1.

FIG. 10 shows the rough operation of the output section in FIG. 1.

FIG. 13 shows the detailed operation of the MPEG decoder in FIG. 1.

FIG. 14 is a continuation to FIG. 13.

FIG. 15 is a continuation to FIG. 14.

FIG. 16 is a continuation to FIG. 15.

DETAILED DESCRIPTION OF THE INVENTION

An MPEG decoder for reproducing moving picture data in real time is now illustrated by making reference to the accompanying drawing figures.

Figure 1:
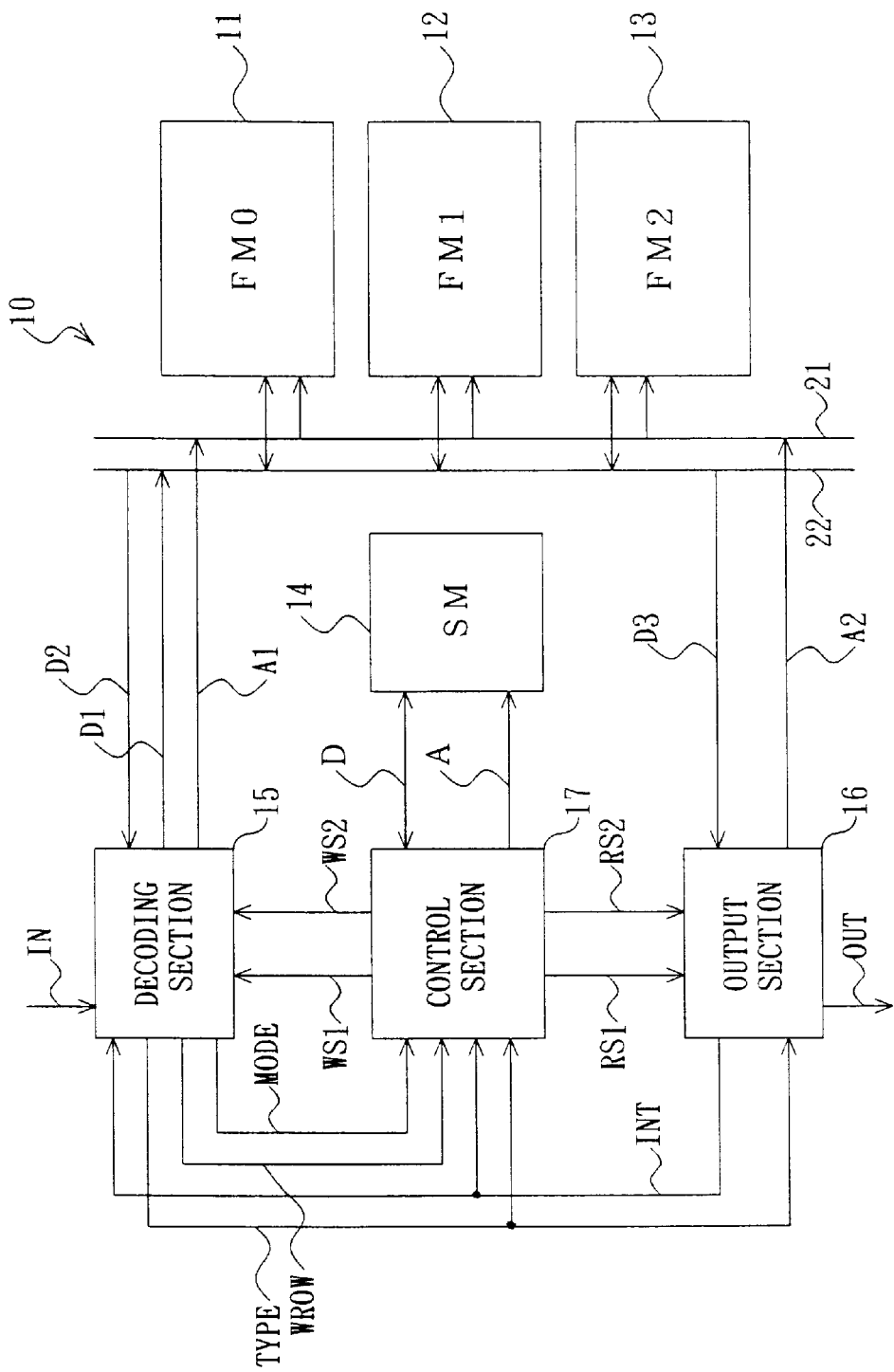
FIG. 1 is a block diagram illustrating an MPEG decoder in accordance with the present invention.

FIG. 1 shows the structure of an MPEG decoder made in accordance with the present invention. The MPEG decoder 10 has a first frame memory (FM0) 11 for storing 1-frame data, a second frame memory (FM1) 12 for storing 1-frame data, and a third frame memory (FM2) 13 for use in interlace conversion of the B-PICTURE. Each frame memory 11, 12, and 13 is divided into a plurality of slots. The MPEG decoder 10 further has a slot control memory (SM) 14, a decoding section 15, an output section 16, and a control section 17. The slot control memory (SM) 14 stores the numbers of the slots of the third frame memory (FM2) 13. The decoding section 15 decodes an INPUT PICTURE IN and writes image data into one of the three frame memories 11, 12, and 13. The output section 16 reads data out of one of the three frame memories 11, 12, and 13 and provides an OUTPUT PICTURE OUT. The control section 17 refers to the slot control memory (SM) 14 to provide WRITE SLOT NUMBERS WS1 and WS2 and READ SLOT NUMBERS RS1 and RS2. 21 is an address bus. 22 is a data bus.

Figure 2:
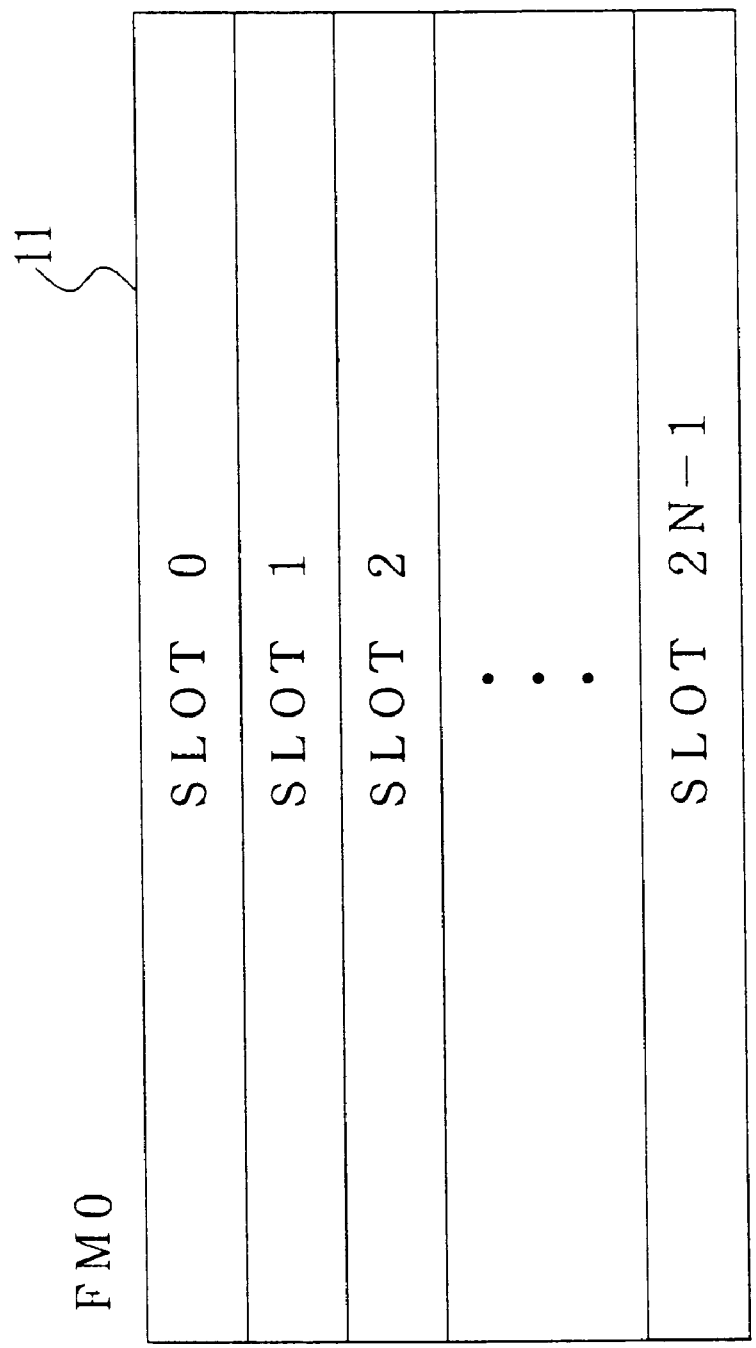
FIG. 2 is a conceptual diagram depicting the internal structure of a first frame memory in FIG. 1.

FIG. 2 shows the internal structure of the first frame memory (FM0) 11. This first frame memory (FM0) 11 is made up of 2N slots numbered from 0 up to 2N−1. N is the quantity depending on the image size used in decoding by the MPEG decoder 10. For example, N=30 in the case of images of NTSC (National Television System Committee). Each slot of the first frame memory (FM0) 11 has a memory capacity of eight lines. In other words, the first frame memory (FM0) 11 has a joint memory capacity of 480 lines equivalent to data of one NTSC frame.

Figure 3:
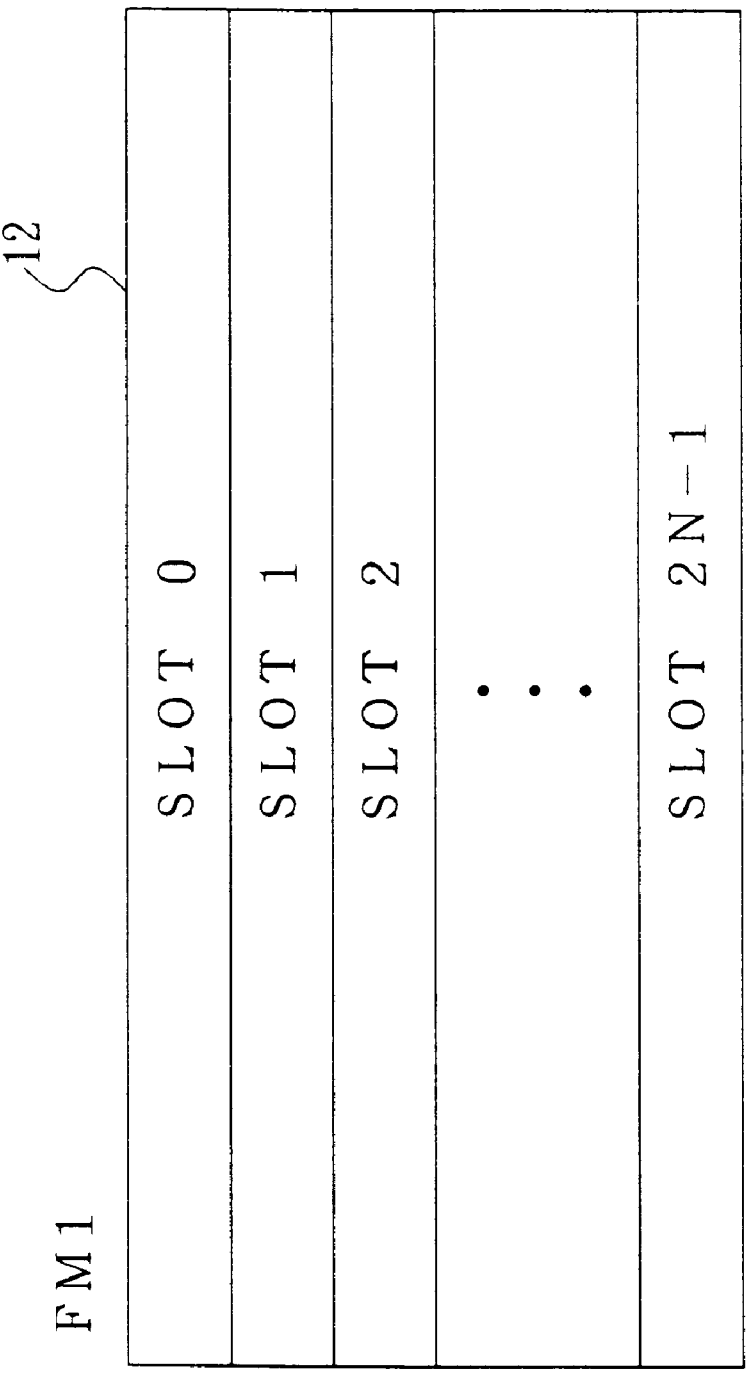
FIG. 3 is a conceptual diagram depicting the internal structure of a second frame memory in FIG. 1.

FIG. 3 shows the internal structure of the second frame memory (FM1) 12. Like the first frame memory (FM0) 11, the second frame memory (FM1) 12 is made up of 2N slots numbered from 0 up to 2N−1. Each slot of the second frame memory (FM1) 12 has a memory capacity of eight lines.

Figure 4:
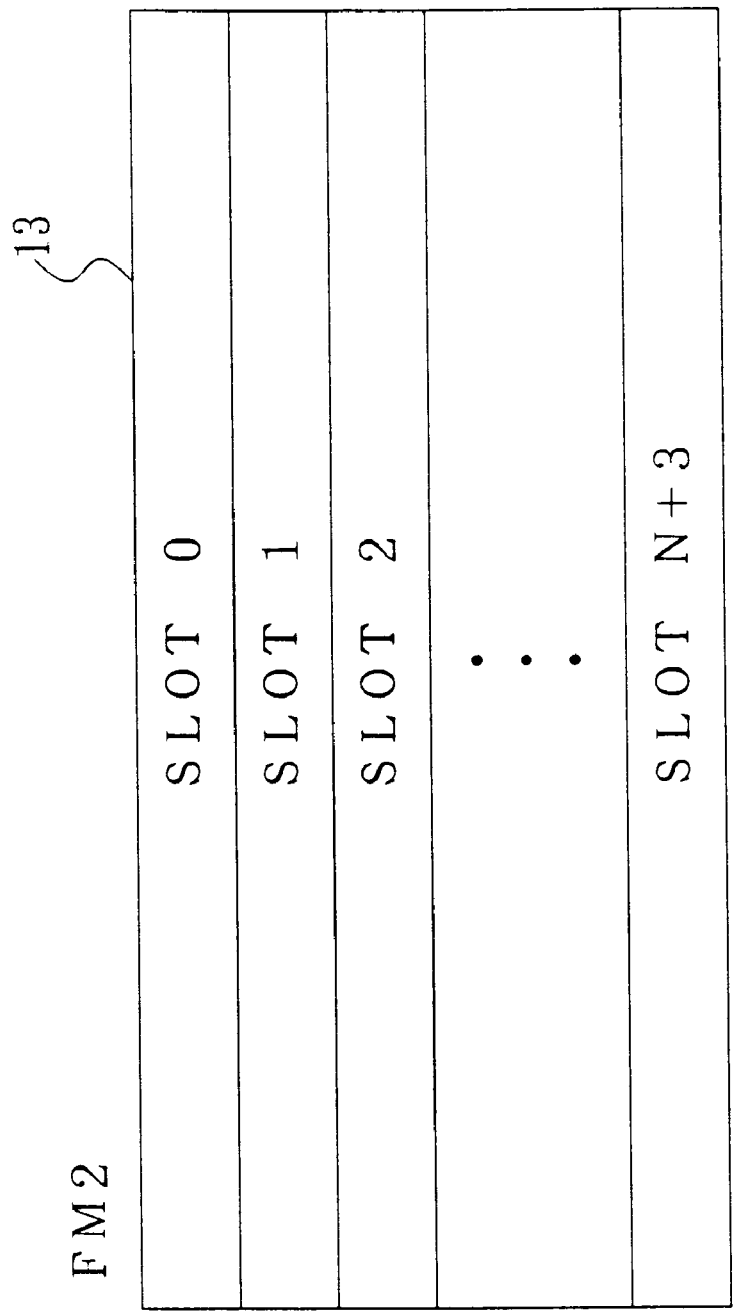
FIG. 4 is a conceptual diagram depicting the internal structure of a third frame memory in FIG. 1.

FIG. 4 shows the internal structure of the third frame memory (FM2) 13. The third frame memory (FM2) 13 is made up of N+4 slots numbered from 0 up to N+3. Each slot of the third frame memory (FM2) 13 has a memory capacity of eight lines.

Figure 5:
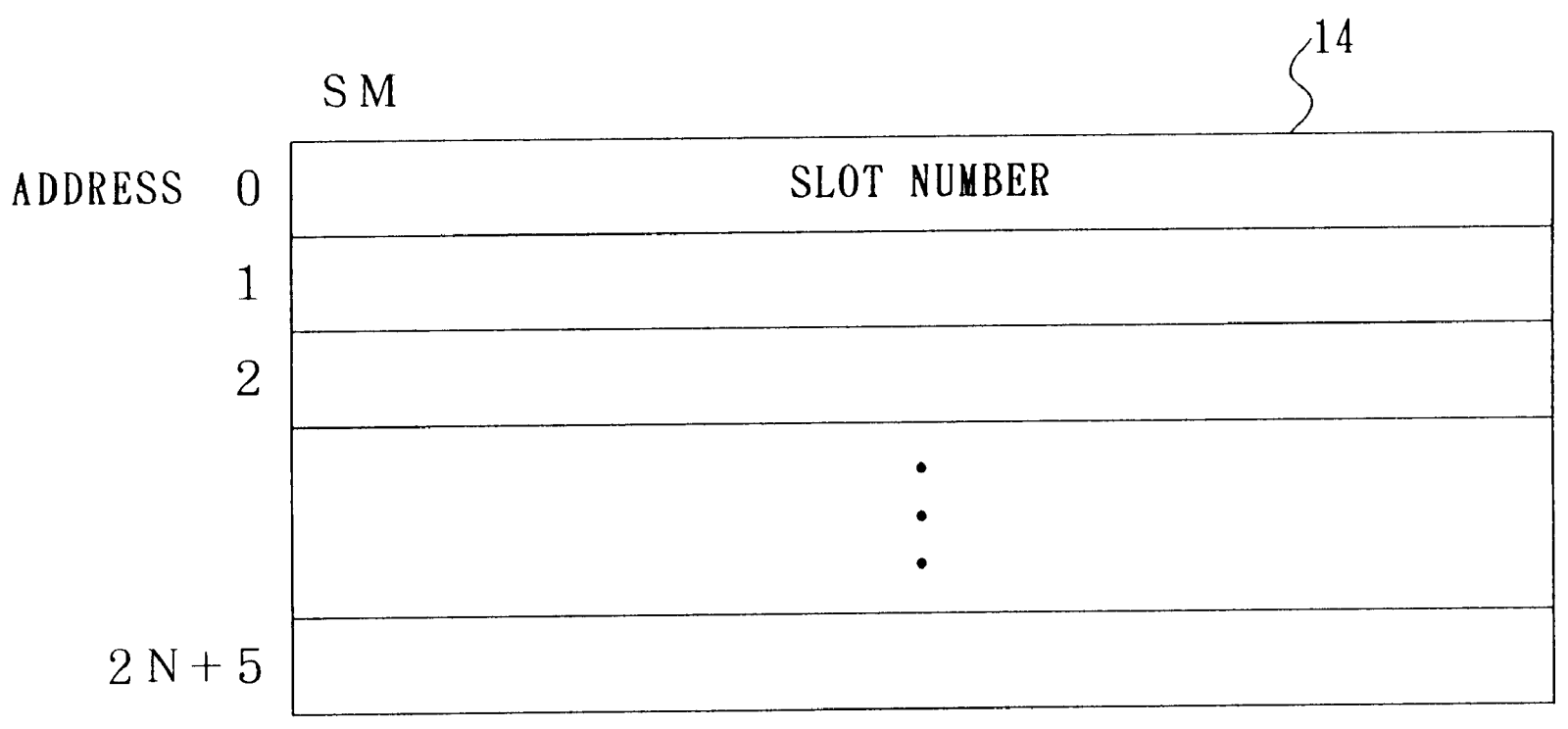

FIG. 5 shows the internal structure of the slot control memory (SM) 14. This slot control memory (SM) 14 is made up of 2N+6 storage locations (words) with respective addresses from 0 up to 2N+5. Each word of the slot control memory (SM) 14 stores a slot number of the slot numbers assigned to the N+4 slots of the third frame memory (FM2) 13.

Figure 6:
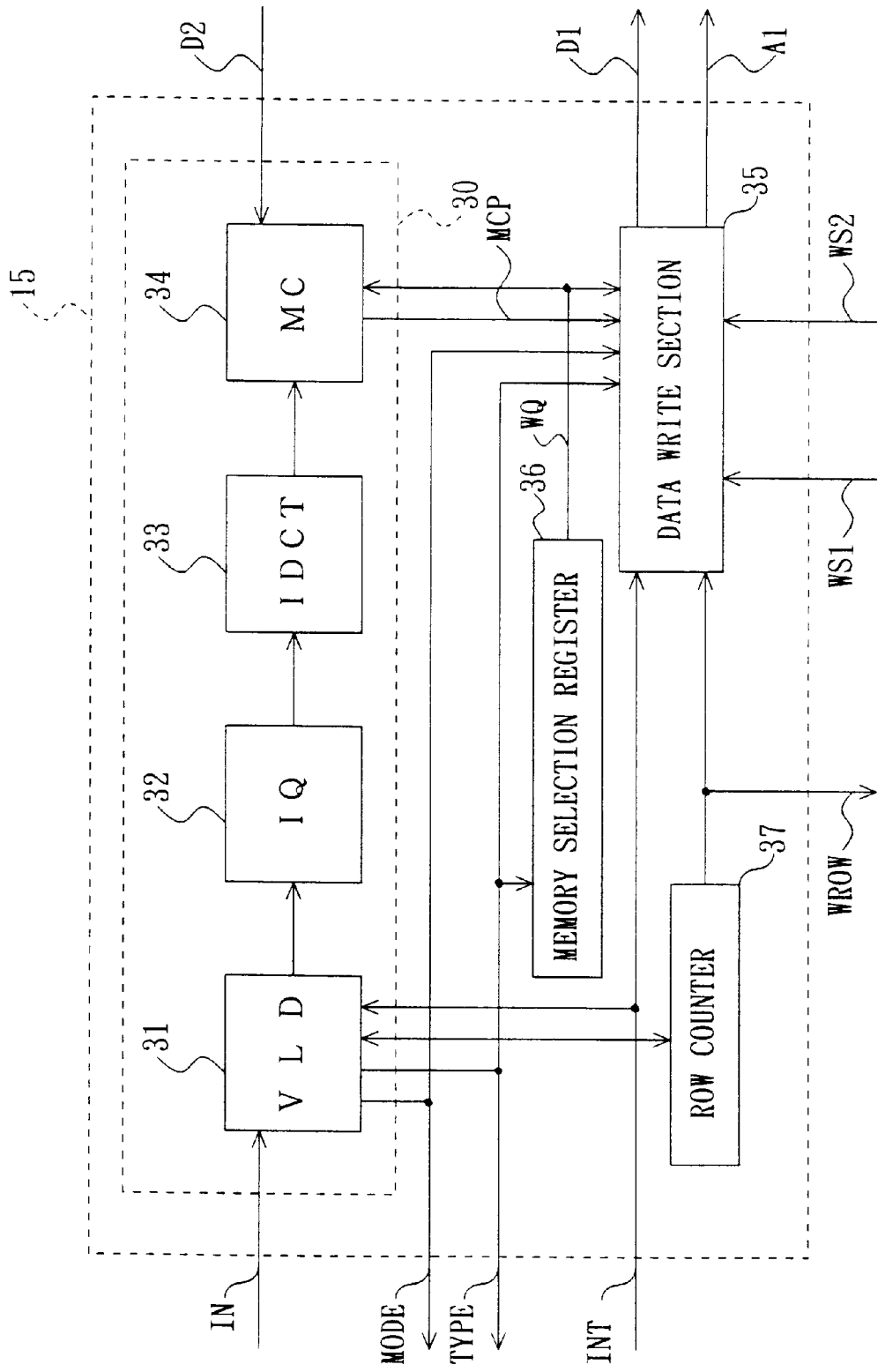
FIG. 6 is a block diagram depicting the internal structure of a decoding section in FIG. 1.

FIG. 6 shows the internal structure of the decoding section 15. The decoding section 15 is mainly formed of a variable length decoder (VLD) 31, an inverse quantizer (IQ) 32, an inverse discrete cosine transformer (IDCT) 33, and a motion compensator (MC) 34. In addition, the decoding section 15 further has a data write section 35, a memory selection register 36, and a row counter 37.

The decoding section 15 decodes a bit stream of the INPUT PICTURE IN and writes the result, DATA D1, in one of the first to third frame memories 11, 12, and 13. Additionally, the decoding section 15 analyzes the INPUT PICTURE IN to provide a MODE signal, a TYPE signal, and a WRITE ROW NUMBER WROW. The decoding section 15, when performing decoding operations, refers either to the data written to the first frame memory (FM0) 11 or the data written to the second frame memory (FM1) 12 as predictive image data, DATA D2, for motion compensation. A1 is an address that is sent to the address bus 21. At the time of the writing of the third frame memory (FM2) 13, the WRITE SLOT NUMBERS WS1 and WS2 from the control section 17 are utilized. The operating timing of the decoding section 15 is controlled by an INTERRUPTION (INT) signal from the output section 16.

The INPUT PICTURE IN is divided into (A) a portion of additional information indicative of the coding type, the FR structure, and the FD structure and (B) a portion of pixel data. It is arranged such that the additional information portion is fed to the VLD 31 prior to the pixel data portion. The VLD 31, when it receives the INPUT PICTURE IN, provides the TYPE signal indicative of the coding type of frame ("I", "P" or "B") and the MODE signal indicative of the structure type ("FR" or "FD"). Both the TYPE and MODE signals remain unchanged, until the decoding of a frame is completed and the decoding of additional information about the next image begins. Subsequently, the decoding of the pixel data portion starts, while on the other hand the VLD 31 enters the state of waiting for the INT signal to come in for every sixteen lines. The reason for this standby is to establish synchronization between the output section 16 and the data read section, and its timing is described later. A quantity of sixteen lines corresponds to the total number of vertical pixels contained in a single macro block, i.e., sixteen pixels in the vertical direction. After finishing decoding a 1-frame image, the VLD 31 starts decoding the next image.

The row counter 37 shows, by the unit of sixteen lines, the whereabouts of a group of sixteen lines under decoding in an image. Rewriting operations are carried out by the VLD 31. The row counter 37 is incremented by one whenever the VLD 31 finishes decoding sixteen lines. The row counter 37 is reset to zero while the VLD 31 decodes additional information. The contents of the row counter 37 are applied as the WRITE ROW NUMBER WROW to the control section 17 and are used for making a decision on which slot of the memory to be written by the data write section 35.

A final decoding image MCP, which is prepared by the MC 34, is written by the data write section 35 into one of the first to third frame memories 11, 12, and 13. The data write section 35 generates the ADDRESS A1 by referring to the WRITE SLOT NUMBERS WS1 and WS2, the TYPE signal, the MODE signal, and the value of the memory selection register 36 (the VALUE WQ), and sends the DATA D1 onto the data bus 22. The VALUE WQ affects a selection by the data write section 35 of which frame memory to use and a selection by the MC 34 of which frame memory to use.

Figure 7:
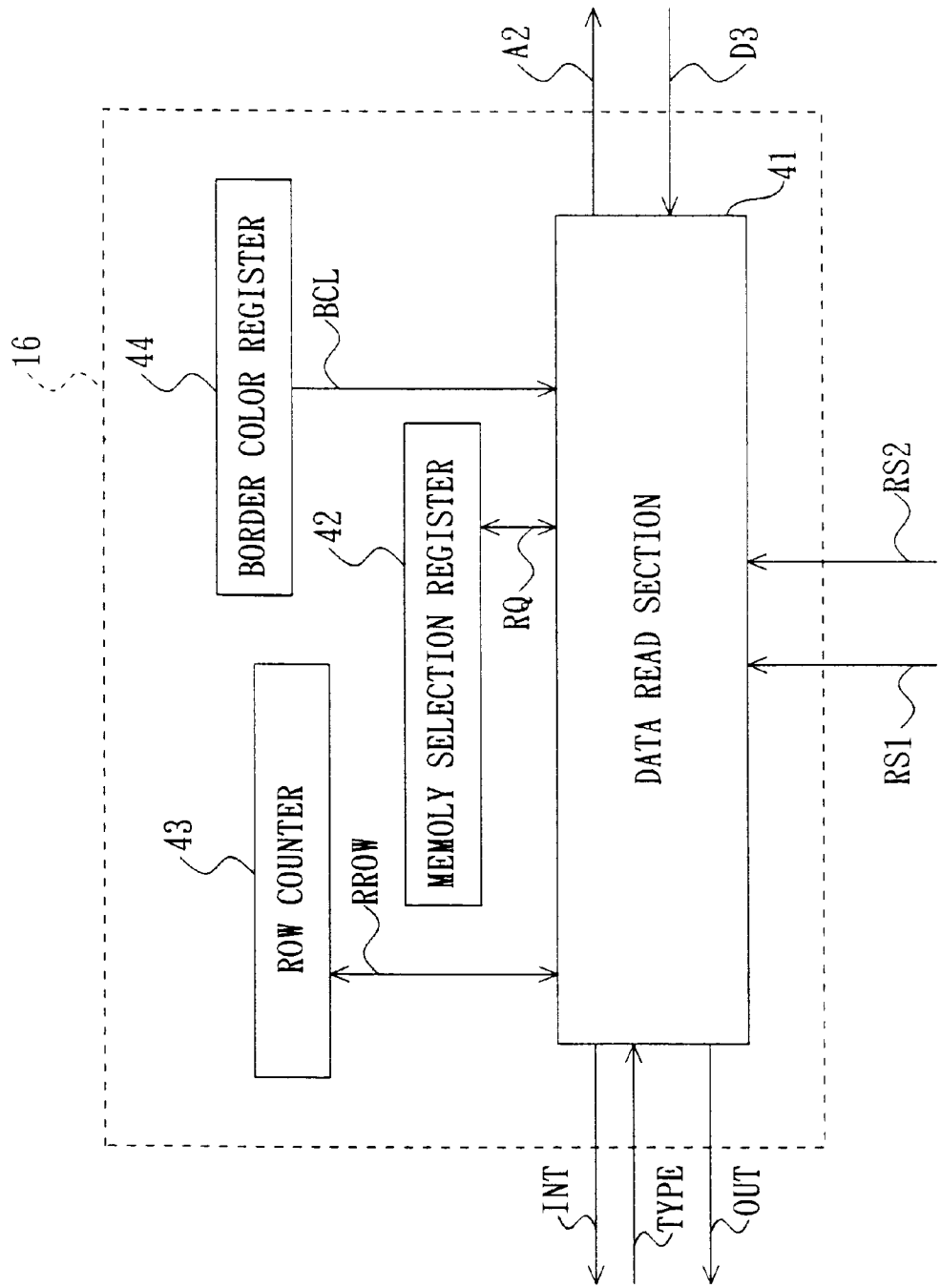
FIG. 7 is a block diagram depicting the internal structure of an output section in FIG. 1.

FIG. 7 shows the internal structure of the output section 16. The output section 16 has a data read section 41, a memory selection register 42 for holding a VALUE RQ, a row counter 43 for providing a READ ROW NUMBER RROW, and a border color register 44 for holding a border color (BCL) signal. The data read section 41 reads decoding data, DATA D3, out of one of the first to third frame memories 11, 12, and 13 and provides the OUTPUT PICTURE OUT. A2 is an address that is sent to the address bus 21. Additionally, the date read section 41 provides the INT signal in order to control the operating timing of another block. A storage location out of which the data read section 41 reads data, is decided according to the TYPE signal from the decoding section 15 and the READ SLOT NUMBERS RS1 and RS2.

The output section 16 plays a role in providing data read out of one of the three frame memories 11, 12, and 13 at the correct timing. The OUTPUT PICTURE OUT has a vertical retrace line block and an active period during which image output is actually executed. During an active period following the first vertical retrace line block, top field data is provided, and during the subsequent active period bottom field data is provided. The output section 16 provides the INT signal, when a vertical retrace line block begins and when a 16-line data output starts. An INT signal carries information about whether the vertical retrace line block begins when the INT signal is outputted and information about which portion of a frame is currently being outputted.

Figure 8:
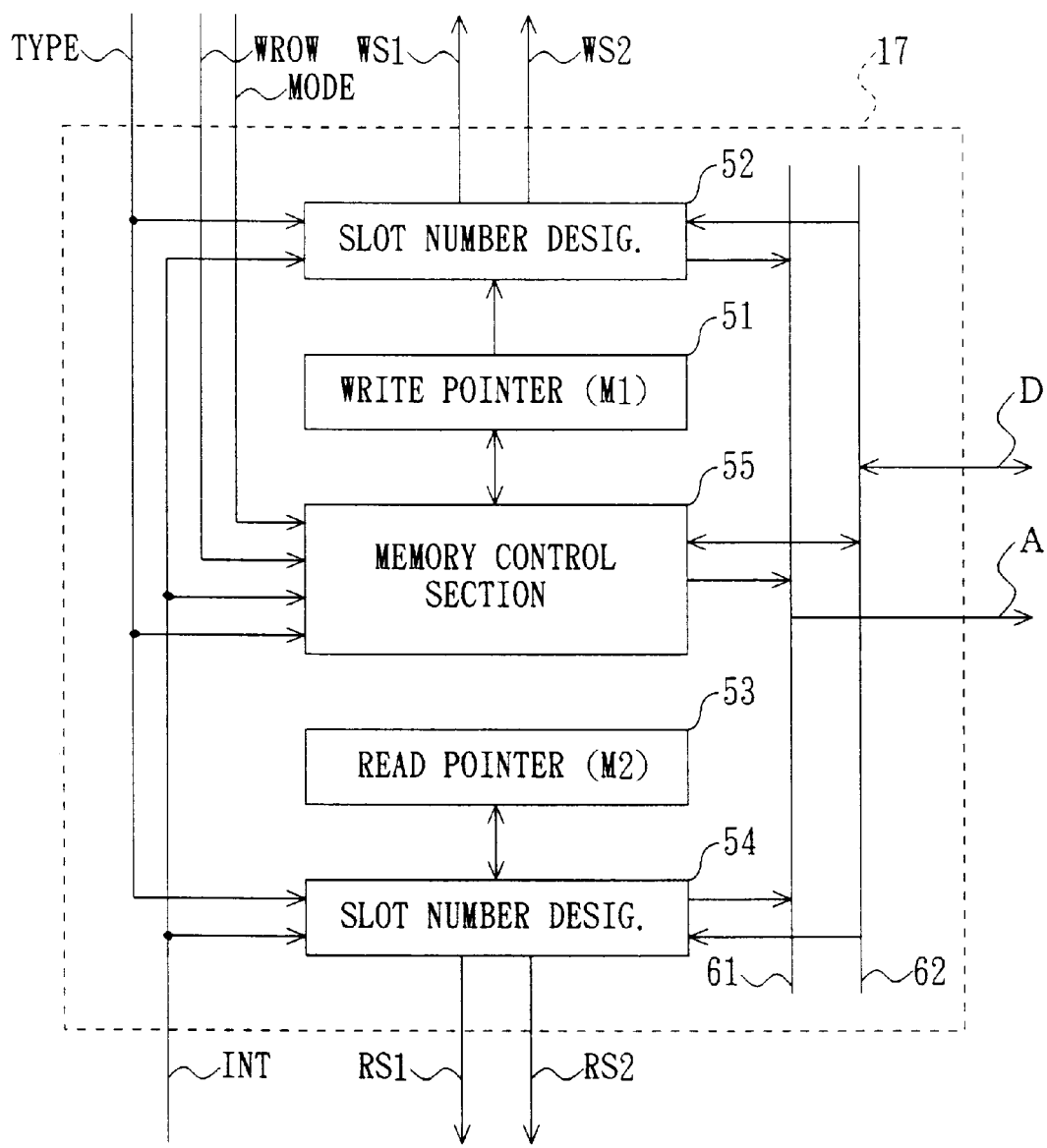
FIG. 8 is a block diagram depicting the internal structure of a control section in FIG. 1.

FIG. 8 shows the internal structure of the control section 17. The control section 17 has a write pointer (M1) 51, a read pointer (M2) 53, a first slot number designation section 52, a second slot number designation section 54, and a memory control section 55. Each pointer 51, 53 holds the individual addresses of the slot control memory (SM) 14. The first slot number designation section 52 designates a slot into which the output section 15 writes data. The second slot number designation section 54 designates a slot out of which the output section 16 reads data. The memory control section 55 controls the slot control memory (SM) 14. 61 is an address bus. 62 is a data bus. A is an address that is sent to the slot control memory (SM) 14. D is data (slot number) on the data bus 62. Memory control operations, at the time of interlace conversion of the B-PICTURE, are executed by the slot control memory (SM) 14, the memory control section 55, the write pointer (M1) 51, the read pointer (M2) 53, and the first and second slot number designation sections 52 and 54.

The first slot number designation section 52 extracts two slot numbers at addresses of the slot control memory (SM) 14 pointed by the write pointer (M1) 51 and provides these two slot numbers to the decoding section 15 as the WRITE SLOT NUMBER WS1 and as the WRITE SLOT NUMBER WS2, respectively. The timing of this output is based on the INT signal from the output section 16 and the TYPE signal from the decoding section 15.

The memory control section 55 extracts two slot numbers from the slot control memory (SM) 14 wherein the write pointer (M1) 51 is used as an address, and writes these two slot numbers at different addresses of the slot control memory (SM) 14. The two slot numbers thus extracted agree with the WRITE SLOT NUMBERS WS1 and WS2, respectively. The different addresses are calculated from the write pointer (M1) 51, the MODE signal, and the WRITE ROW NUMBER WROW. The timing of this operation is based on the INT signal from the output section 16 and the TYPE signal from the decoding section 15. The value of the write pointer (M1) 51 is incremented by two by the memory control section 55 after the writing of the slot control memory (SM) 14 is completed and after the first slot number designation section 52 designates the WRITE SLOT NUMBERS WS1 and WS2 to the decoding section 15.

The second slot number designation section 54 extracts two slot numbers at addresses of the slot control memory (SM) 14 pointed by the read pointer (M2) 53 and provides these two slot numbers to the output section 16 as the READ SLOT NUMBER RS1 and as the WRITE SLOT NUMBER RS2, respectively. The second slot number designation section 54 subsequently increases the value of the read pointer (M2) 53 by two. The timing of this operation is based on the INT signal from the output section 16 and the TYPE signal from the decoding section 15.

A process of selecting a write frame memory is now described together with a process of selecting a reference frame memory for motion compensation. A memory is selected at the time when additional information about a frame is decoded, and is used until the decoding of the frame is completed. The VALUE WQ of the memory selection register 36 is either "0" or "1" and its initial value is "0". The operation is switched by the TYPE signal from the VLD 31 as follows.

A case where TYPE="I" is first described. If WQ="0", then the data write section 35 selects the first frame memory (FM0) 11 as a write frame memory. On the other hand, if WQ="1", then the data write section 35 selects the second frame memory (FM1) 12 as a write frame memory. When the writing of the I-PICTURE is completed, the VALUE WQ of the memory selection register 36 is updated before the next picture is decoded. In other words, if WQ was "0", then the VALUE WQ is updated to "1", while, if WQ was "1", then the VALUE WQ is updated to "0". Note that no motion compensation is performed.

A case where TYPE="P" is described. If WQ="0", the data write section 35 selects the first frame memory (FM0) 11 as a write frame memory. On the other hand, if WQ="1", the data write section 35 selects the second frame memory (FM1) 12 as a write frame memory. The data write section 35 further selects the second frame memory (FM1) 12 as a forward-reference frame memory if WQ="0", while on the other hand it selects the first frame memory (FM0) 11 as a forward-reference frame memory if WQ="1". When the writing of the P-PICTURE is completed, the VALUE WQ of the memory selection register 36 is updated before the next picture is decoded. In other words, if WQ was "0", then the VALUE WQ is updated to "1", while, if WQ was "1", then the VALUE WQ is updated to "0".

A case where TYPE="B" is explained. In this case, writing operations are always made to the third frame memory (FM2) 13. If WQ="0", then the data write section 35 selects the first frame memory (FM0) 11 as a forward-reference frame memory and the second frame memory (FM1) 12 as a backward-reference frame memory. If WQ="1", then the data write section 35 selects the second frame memory (FM1) 12 as a forward-reference frame memory and the first frame memory (FM0) 11 as a backward-reference frame memory. Here, the VALUE WQ of the memory selection register 36 is not updated.

FIG. 9 roughly shows the operation of the decoding section 15. FIG. 9 shows an example in which input pictures' bit streams are sequentially fed to the decoding section 15 in the I0→P1→P4→B2→B3 order. For example, the letter "I" of I0 indicates the coding type such as "I", "P" and "B" and the number thereof indicates the order of display.

The PICTURE I0 is first inputted to the decoding section 15. The PICTURE I0 is written into the first frame memory (FM0) 11, for TYPE="I" and WQ="0". When the decoding of the PICTURE I0 is completed, the VALUE WQ is updated to "1". The PICTURE P1 is subsequently inputted. The PICTURE P1, which is motion-compensated, is written into the second frame memory (FM1) 12, for TYPE="P" and WQ="1". At this time, the MC 34 forward-refers to the PICTURE I0 that has been already written in the first frame memory (FM0) 11. When the decoding of the PICTURE P1 is completed, the VALUE WQ is updated to "0". The PICTURE P4 is subsequently inputted. The PICTURE P4, which is motion-compensated, is written into the first frame memory (FM0) 11, for TYPE="P" and WQ="0". At this time, the MC 34 forward-refers to the PICTURE P1 which has been already written in the second frame memory (FM1) 12. When the decoding of the PICTURE P4 ends, the VALUE WQ is updated to "1". The PICTURE B2 is subsequently inputted. The PICTURE B2, which is motion-compensated, is written into the third frame memory (FM2) 13, for TYPE="B". At this time, since WQ="1", the MC 34 not only forward-refers to the PICTURE P1 which has been already written in the second frame memory (FM1) 12 and but also backward-refers to the PICTURE P4 which has already been written in the first frame memory (FM0) 11. The VALUE WQ is not updated. The PICTURE P3 is subsequently inputted. The PICTURE P3, which is motion-compensated, is written into the third frame memory (FM2) 13, for TYPE="B". At this time, since WQ="1", the MC 34 forward-refers to the PICTURE P1 which has been already written in the second frame memory (FM1) 12 and backward-refers to the PICTURE P4 which has already been written in the first frame memory (FM0) 11. The VALUE WQ is not updated.

As described above, with regard to the I- and P-PICTURES, the first frame memory (FM0) 11 and the second frame memory (FM1) 12 are alternately used. With regard to the B-PICTURE, writing operations are always made to the third frame memory (FM3) 13, and the first and second frame memories 11 and 12 are used as reference frame memories for motion compensation.

The description of which slot of a selected frame memory to be written is now given. The data write section 35 decides two write slots for every sixteen lines and writes data of sixteen lines in total into the two slots. These write slots are decided according to the TYPE signal, the MODE signal, the WRITE ROW NUMBER WROW, and the WRITE SLOT NUMBERS WS1 and WS2. The procedure is described below.

A case where TYPE="I" or "P" is explained. If MODE="FR", decoded sixteen lines are divided into a group of eight top field lines and a group of eight bottom field lines. Whereas the eight top field lines are written into a slot having a slot number identical with the WRITE ROW NUMBER WROW, the eight bottom field lines are written into a slot having a slot number of WROW+N. If MODE="FD", decoded sixteen lines are divided into a group of eight upper lines and a group of eight lower lines. Whereas the eight upper lines are written into a slot having a slot number of WROW×2, the eight lower lines are written into a slot having a slot number of WROW×2+1. For both the FR structure and the FD structure, what is written into regions having a slot number lower than N is top field data only, and what is written into regions having a slot number greater than N is bottom field data only. Additionally, in the same field, the order in which the slot number increases agrees not only with the order of writing of decoded image data, it also agrees with the order of interlace output. This write method provides the advantage that image output is performed, in an interlace fashion, in the correct order by means of simple reading operations in the order in which the slot number increases. This read way is described in detail later.

A case where TYPE="B" is now described. If MODE="FR", decoded sixteen lines are divided into a group of eight top field lines and a group of eight bottom field lines. Whereas the eight top field lines are written into a slot having a slot number of WS1, the eight bottom field lines are written into a slot having a slot number of WS2. If MODE="FD", decoded sixteen lines are divided into a group of eight upper lines and a group of eight lower lines. Whereas the eight upper lines are written into a slot having a slot number of WS1, the eight lower lines are written into a slot having a slot number of WS2. None of the slots of the third frame memory (FM2) 13 store both top field data and bottom field data at the same time. In this case, since the slot number is given from the first slot number designation section 52, the operation of the data write section 35 is simple.

Next, a process of selecting a read frame memory is described. A read frame memory is determined, according to the TYPE signal and the VALUE RQ of the memory selection register 42 when the top field image output starts. The VALUE RQ is either "0", "1", or "2" and its initial value is "2". A border color register 44 is employed to designate an initial-state color.

A case where TYPE="I" or "P" is explained. If RQ="2", then the data read section 41 provides a border color (BCL) signal set in the border color register 44 as the OUTPUT PICTURE OUT and updates the VALUE RQ to "0" when a 1-frame output is completed. If RQ="0", then the data read out section 41 reads data out of the first frame memory (FM0) 11, gives an output, and updates the VALUE RQ to "1" when a 1-frame output is completed. If RQ="1", then the data read out section 41 reads data out of the second frame memory (FM1) 12, gives an output, and updates the VALUE RQ to "0" when a 1-frame output is completed.

For TYPE="B", the data read section 41 reads data always out of the third frame memory (FM2) 13 and gives outputs. The VALUE RQ of the memory selection register 42 is not updated.

FIG. 10 shows the rough operation of the output section 16. In FIG. 10, one column corresponds to half a frame period. The decoding of the PICTURE I0 starts at the time when the bottom field of its preceding picture is outputted.

As described previously, for the I- and P-PICTURES, writing operation are performed alternately using the first frame memory (FM0) 11 and the second frame memory (FM1) 12 and reading operations are likewise performed alternately using these two memories 11 and 12, but at different timing. As a result, output operation is performed in the order shown in FIG. 10, i.e., the memory 11 (I0)→the memory 12 (P1)→the memory 13(B2)→the memory 13 (B3). Here, B2 and B3 are outputted prior to P4, which is reasonable when considering the fact that P4 is referred to at the time of the decoding of B2 and B3. This shows that encoded images are outputted in the correct order.

In FIG. 10, in a period in which writing and reading operations are executed to different frame memories, image output is performed normally. During the output period of the bottom field of the PICTURE I0 (i.e., BOTTOM 0), the writing of the memory 11 and the reading of the memory 11 are simultaneously performed. This will not cause the top field data of the PICTURE P4 to be written into the first frame memory (FM0) 11 before the bottom field data of the PICTURE I0 is read out of the first frame memory (FM0) 11, which is described later. Although both during the output period of the top field of the PICTURE B2 (i.e., TOP 2) and during the output period of the top field of the PICTURE B3 (i.e., TOP 3), the writing and reading of the third frame memory (FM2) 13 are simultaneously performed, no problems occur. This is described later.

The description of which slot of a selected frame memory to be read is given. The data read section 41 decides two slot numbers when starting providing a 16-line output, the one for the output of the first-half eight lines and the other for the output of the second-half eight lines, and a row counter 43 is employed which is incremented by one for every sixteen lines. The value of the row counter 43, i.e., the READ ROW NUMBER RROW, indicates which part of a frame is currently being image-outputted. During the period in which the first sixteen top field lines are being outputted, RROW= "0", and thereafter, RROW is incremented by one for every 16-line output.

A case where TYPE="I" or "P" is described. A slot having a slot number of RROW×2 is used for first eight lines. A slot having a slot number of RROW×2+1 is used for the next eight lines. As described previously (see the description of the data write), with regard to the I- and P-PICTURES, the top field and the bottom field are separately stored, regardless of the structure. Therefore, if reading operations are performed in the above-described procedure, the bottom field and the top field are correctly outputted in that order.

Where TYPE="B", the READ SLOT NUMBERS RS1 and RS2 given from the second slot number designation section 54 are used.

As described above, for the case of the I- and P-PICTURES, data is read out of each slot in a fixed order. For the case of the B-PICTURE, data is read out of a slot designated by the second slot number designation section 54. Because of such arrangement, the operation of the data read section 41 is most simple.

Next, how the WRITE SLOT NUMBERS WS1, WS2 and the READ SLOT NUMBERS RS1, RS2 are decided is explained. Roughly, the operation of each of the first and second slot number designation sections 52 and 53 is just to read a slot number from the slot control memory (SM) 14 and to provide it. The operation of the memory control section 55 is just to extract a slot number stored at an address of the slot control memory (SM) 14 and to store data about the slot number extracted at a different address. Address calculations for storing the address are very simple. This address storage enables the second slot number designation section 54 to designate the READ SLOT NUMBERS RS1 and RS2 in the correct order.

The contents of the first N+4 words of the slot control memory (SM) 14 are initialized to respective slot numbers from 0 to N+3. The write pointer (M1) 51 is "0" in its initial state. The read pointer (M2) 53 is "X" in its initial state, where the number "X" indicates the number of slots of the third frame memory (FM2) 13, i.e., N+4.

The first slot number designation section 52 reads two slot numbers from the slot control memory (SM) 14 and provides these two slot numbers as the WRITE SLOT NUMBER WS1 and as the WRITE SLOT NUMBER WS2, respectively. Read addresses that are fed to the slot control memory (SM) 14 are M1 and M1+1. The second slot number designation section 54 reads two slot numbers from the slot control memory (SM) 14 and provides these two slot numbers as the READ SLOT NUMBER RS1 and as the READ SLOT NUMBER RS2, respectively. Read addresses that are fed to the slot control memory (SM) 14 are M2 and M2+1. The first and second slot number designation sections 52 and 54 each operate every time sixteen lines of the B-PICTURE are decoded; however, they do not operate at all at the time of the decoding of the I- or P-PICTURE.

The memory control section 55, when the data write section 35 performs writing operations, uses the write pointer (M1) 51 so as to read from the slot control memory (SM) 14 two slot numbers WS1 and WS2 like the first slot number designation section 52. Read addresses that are at this time fed to the slot control memory (SM) 14 are M1 and M1+1. The memory control section 55 determines the order of the reading of each of the two slots that are currently being written, according to the WRITE ROW NUMBER WROW and the MODE signal, and stores the slot numbers WS1 and WS2 at different storage locations of the slot control memory (SM) 14. More specifically, if MODE= "FR", then the value of WS1 is stored at an address M1+X−WROW of the memory 14 and the value of WS2 is stored at an address M1+X−WROW+N of the memory 14. On the other hand, if MODE="FD", then the value of WS1 is stored at an address M1+X of the memory 14 and the value of WS2 is stored at an address M1+X+1 of the memory 14.

Figure 11:
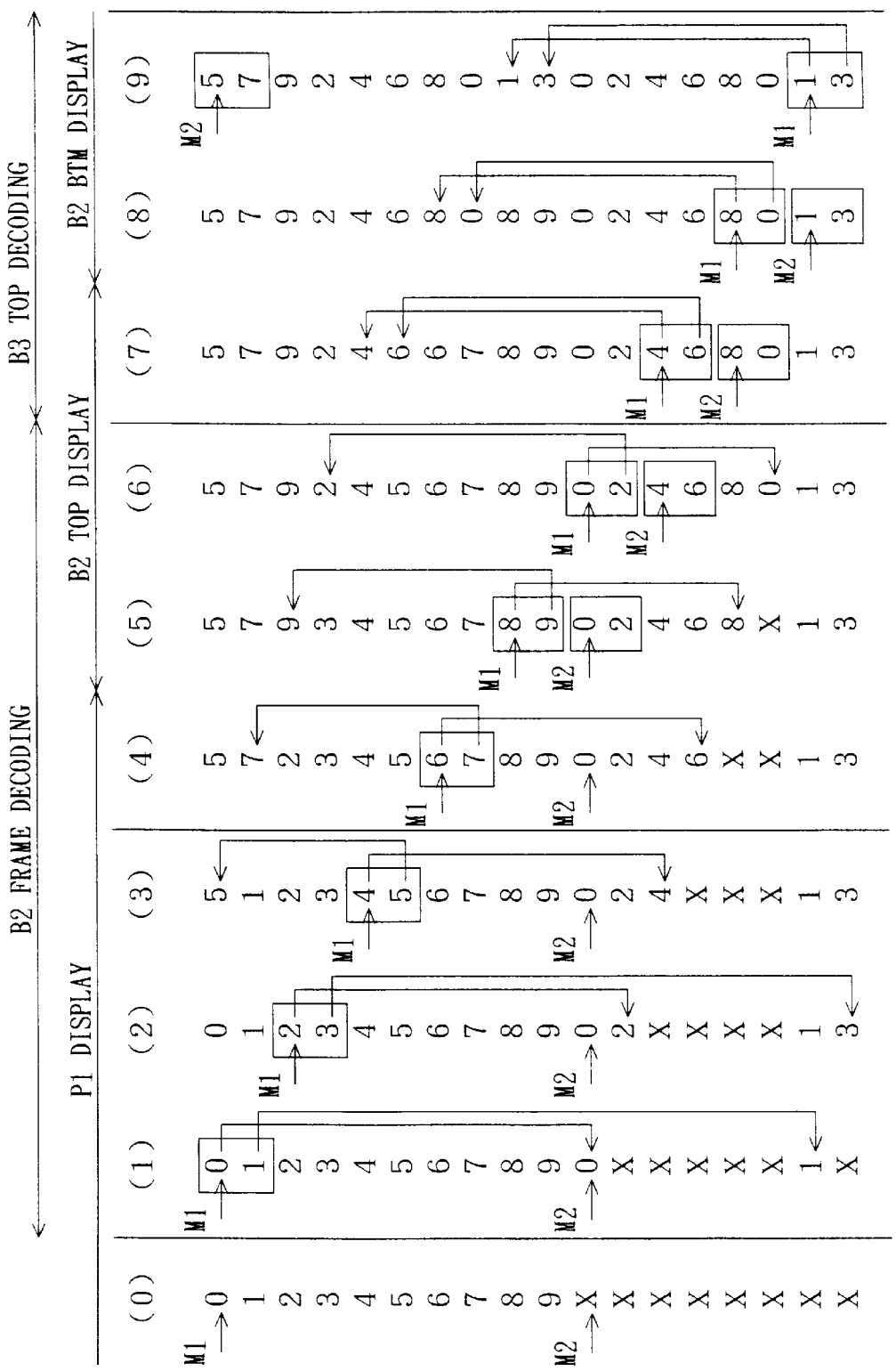
FIG. 11 shows an updating process of the slot control memory in FIG. 1.
Figure 12:
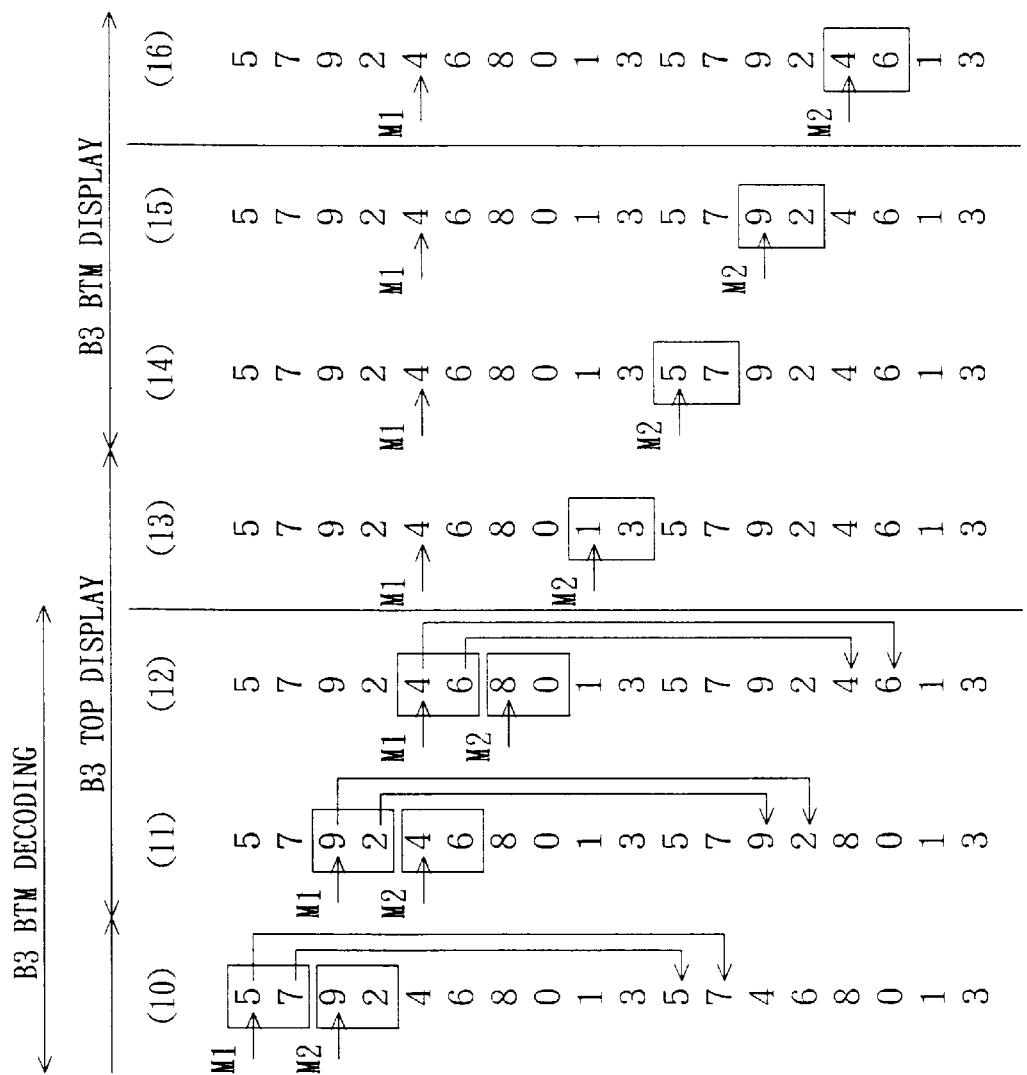
FIG. 12 is a continuation to FIG. 11.

The updating process of the slot control memory (SM) 14 is shown in FIGS. 11 and 12. It is arranged here that N=6 for convenience. The number of slots per frame is twelve. The slot control memory (SM) 14 has a memory capacity capable of storing eighteen slot numbers at eighteen addresses #0 to #17. The PICTURE B2 has a frame structure. The PICTURE B3 has a field structure. Period 0 is the initial state and the first ten words of the slot control memory (SM) 14 are initialized from 0 to 9, respectively.

Period 1 is the point where the decoding of the first sixteen lines of the PICTURE B2 starts. At this time, of the ten slots of the third frame memory (FM2) 13, two slots corresponding to addresses pointed by the write pointer (M1) 51 (i.e., the SLOTS #0 and #1) are used for write operations. The memory control section 55 stores the numbers of the slots thus used, i.e., the numbers 0 and 1, at the addresses #10 and #16 indicated by arrows. The decoding process thereafter proceeds from period 2 to period 3 to period 4. At period 5, the B2 top field output begins. Reading from two slots corresponding to addresses pointed at this time by the read pointer (M2) 53 (i.e., the SLOTS #0 and #2), is executed. While no slot number is stored at an address pointed by the read pointer (M2) 53 at period 0, a slot number is assigned and stored by memory control section 55 at an address pointed by the read pointer (M2) 53. The SLOT #0 and the SLOT #2 store respective top field data of the PICTURE B2. More specifically, the SLOT #0 stores the first eight lines and the SLOT #2 stores the next eight lines. In other words, 16-line data of the top field of the PICTURE B2 are read in the correct order. The slot control memory (SM) 14 is rewritten in order to perform reading in a correct order by the operation of the memory control section 55 at the write time.

Next, period 6 is given a look. Up to period 5, all of the slots of the third frame memory (FM2) 13 (i.e., the SLOTS #0 to #9) have been written. Therefore, from period 6, these slots of the third frame memory (FM2) 13, all of which have been used once, are going to be reused. An address pointed by the write pointer (M1) 51 at period 6 is the very address pointed by the read pointer (M2) 53 at a previous period, i.e., period 5. In this way, an address pointed by the write pointer (M1) 51 is the one previously pointed by the read pointer (M2) 53, in other words such an address designates a slot the reading of which has already been completed. Such a slot accordingly becomes available for the next use. No problems occur even if there exist periods during which reading and writing operations are performed at the same time using the third frame memory (FM2) 13 (e.g., a period during which TOP 2, BOTTOM 2, and TOP 3 are outputted).

When looking at the SLOT #0, data about the SLOT #0 is read at period 5 and is, immediately after that, reused at period 6. The SLOT #0 is used in every period. Additionally, the remaining slots are almost always in use except for when they are in the initial state. This provides a most efficient way of using memory. In accordance with the present invention, B-PICTURE interlace conversion can be accomplished by the third frame memory (FM2) 13 that has a (half a frame+four slots) memory capacity. The capacity of memory can be reduced remarkably.

The detailed operation of the MPEG decoder 10 of FIG. 1 is shown in FIGS. 13–16. A vertical retrace line block, VB, is used so as not to affect the start of the decoding of images. In FIGS. 15 and 16, periods, which corresponds to the ones as shown in FIGS. 11 and 12, are all bracketed.

As previously described, the operation of the VLD 31 comes to a temporary halt before starting decoding 16-line image data and enters the state of waiting for the INT signal to come in. One reason for this temporal operation stop is to prevent, before the output section 16 needs specific data, the data write section 35 from destroying the data. The other reason is to prevent the output section 16 from reading data the decoding of which has not yet been completed. The timing of when to restart the VLD 31 depends on the TYPE signal, the WRITE ROW NUMBER WROW, and the INT signal.

A case where TYPE="I" or "P" is explained. In the case of trying to decode the first sixteen lines of a specific image frame, the WRITE ROW NUMBER WROW is "0". If WROW=0, then the VLD 31 waits for an output of sixteen bottom field lines to be completed and restarts operating the instant the next sixteen line output starts. In other situations, the WRITE ROW NUMBER WROW has a value other than 0. If WROW≠0, then the VLD 31 restarts operating either the instant the output section 16 starts providing a 16-line output or the instant the vertical retrace line block VB begins.

If TYPE="B", then the VLD 31 restarts operating either when the vertical retrace block VB begins, when the display of top field's sixteen lines, excluding the last sixteen lines, begins, or when the display of bottom field's sixteen lines, excluding the last sixteen lines, begins. Both the first slot number designation section 52 and the memory control section 55 operate at the same timing as the decoding of the B-PICTURE resumes.

Figure 13:
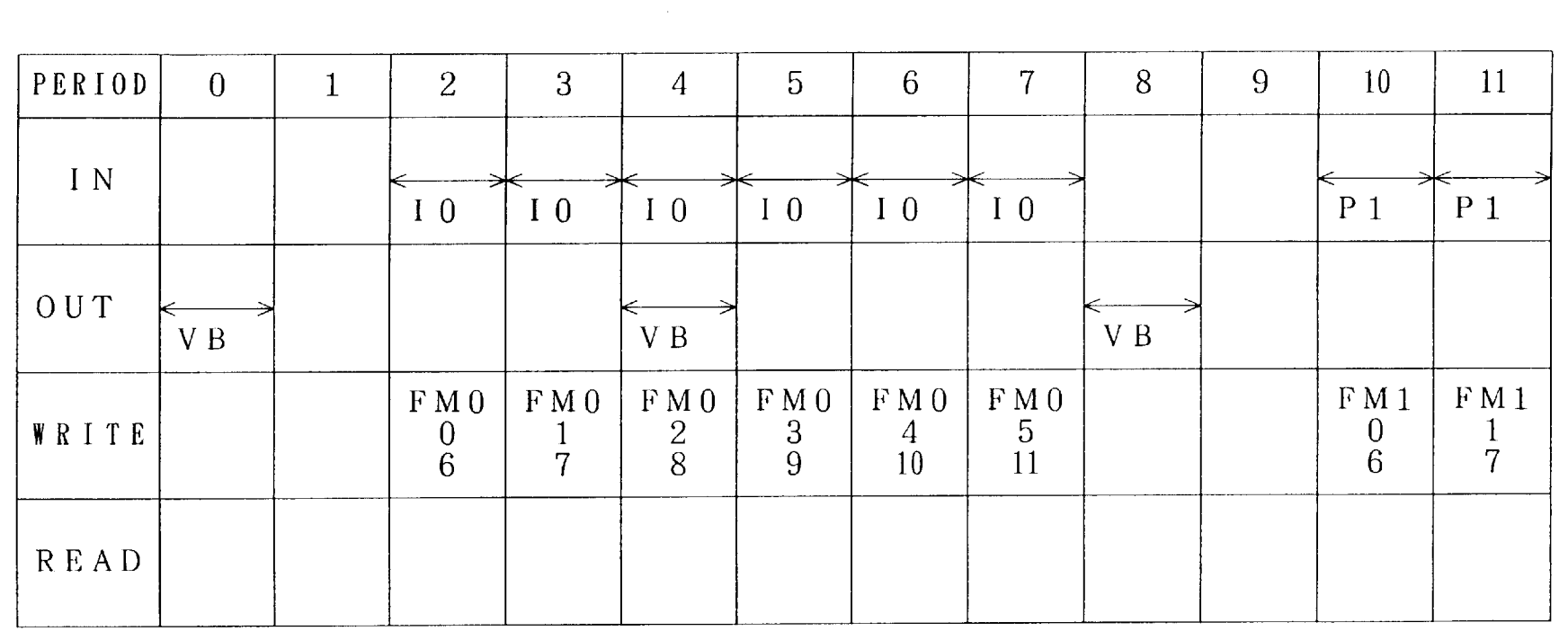

As shown in FIGS. 13 and 14, when performing write operations by decoding the PICTURES I0 and P1, such writing is executed to regions that have not been used at all. The decoding of the next picture (i.e., the PICTURE P4) starts at period 18 after an output of sixteen lines of the bottom field of the PICTURE I0 is completed. Although at period 18 the writing and reading of the first frame memory (FM0) 11 simultaneously take place, no problems occur, since the write slots are the SLOTS #0 and #6 and the read slots are the SLOTS #8 and #9. Data about the SLOT #6 has been read at period 17. If the decoding of the PICTURE P4 starts at period 17, this leads to accidental reading of data about the bottom field of the PICTURE I0. In view of this, the starting point of the decoding of the PICTURE P4 is delayed. Likewise, also at period 19, contention between the writing of the PICTURE P4 and the reading of the PICTURE I0 in the first frame memory (FM0) 11 can be avoided.

The PICTURES B2 and B3 enter the decoding stage (see FIGS. 15 and 16). The starting point of the decoding of B2 and B3 corresponds to the beginning of the vertical retrace line block VB. This timing differs from that of the I- and P-PICTURES. The previously described control technique making use of the slot control memory (SM) 14 is used. As a result, write operations and read operations as shown in FIGS. 15 and 16 are carried out. The SLOT #30, which is read at period 31, is already written at a previous period (i.e., period 30). For the case of the B-PICTURE, a slot, which is read at period n, is written either at period n+1 or at period n+2. Data are outputted without any destruction. It is sufficient for B-PICTURE that the number of slots is ten. This is lower than the slot count per frame (i.e., twelve slots).

In the above-described example, 1 frame=12 slots and 10 slots of the frame are used for the B-PICTURE. If 1 frame=2N slots, then the same control can be obtained by using N+4 slots for the B-PICTURE. It is possible to use N+5 or more slots for the B-PICTURE. In the present invention, 1 slot=8 lines. Control by the greater unit is possible.

As described above, the MPEG decoder 10, shown in FIG. 1, employs a memory with a memory capacity of about two and half a frame, and the operation of its individual circuit blocks is simple.

The invention claimed is:

1. An image processor comprising:

(a) a data memory having a plurality of slots;

(b) a slot control memory for storing slot numbers; and (c) a control section for controlling read and write operations of said data memory by making use of said slot numbers stored in said slot control memory;

wherein said control section writes a slot number, which was used in a write operation of entering information to said data memory, to said slot control memory for performing a read operation of acquiring information from said data memory.

2. The image processor of claim 1, said control section comprising:

(i) a write pointer for designating a storage location of said slot control memory for a slot number which is used in a write operation of said data memory; and (ii) a read pointer for designating a storage location of said slot control memory for a slot number which is used in a read operation of said data memory;

wherein both said pointers are updated such that a certain slot of said data memory is written immediately when said slot is read.

3. The image processor of claim 1, wherein said data memory is used to store B-pictures.

4. The image processor of claim 1, wherein each slot of said data memory has a storage capacity to store a data unit equivalent to half of the number of lines as a decoding process unit.

5. The image processor of claim 4, wherein said control section controls the operation of write of said data memory by making use of two slot numbers.

6. The image processor of claim 4, wherein said data memory is used to store a B-picture and, when said B-picture has a frame structure, said control section uses two slot numbers for controlling the operation of write of said data memory in order that data units for a top and a bottom field together forming said B-picture may be written to said data memory.

7. The image processor of claim 6, wherein said control section writes said two slot numbers to at storage locations of said slot control memory which are separated from each other by an amount of variation in a value of a read pointer made in a period from the time said top field's data are read to the time said bottom field's data are read.

8. The image processor of claim 4, wherein said data memory is used to store a B-picture and, when said B-picture has a field structure, said control section uses two slot numbers for controlling the operation of write of said data memory in order that an upper half data field and a lower half data field together forming said B-picture may be written to said data memory.

9. The image processor of claim 8, wherein said control section writes said two slot numbers to said slot control memory in order that a read pointer may acquire, in succession, data for said upper half field and data for said lower half field.

10. The image processor of claim 1, wherein said data memory is used to store B-pictures only, and wherein said image processor further comprises a first memory and a second memory, said first and second memories being used alternatively to store either I-pictures or P-pictures.

11. An image processing method comprising:

(a) a step of decoding an input bit stream;

(b) a step of writing results of said decoding step to storage locations of a memory designated by a write pointer; and (c) a step of reading said results from storage locations of said memory designated by a read pointer;

wherein a top field and a bottom field both resulting from said decoding step are stored at storage locations of said memory separated from each other when said input bit stream has a header indicating a frame structure, and wherein an upper half portion and a lower half portion both resulting from said decoding step are stored at storage locations of said memory next to each other when said input bit stream has a header indicating a field structure.

12. The image processing method of claim 11, wherein a storage unit of said memory is a slot with a storage capacity to store half of the number of lines as a unit of processing of said decoding step.

* * * * *